United States Patent [19]
Grenot et al.

[11] Patent Number: 5,220,563
[45] Date of Patent: Jun. 15, 1993

[54] DEVICE FOR THE TRANSMISSION BY AN ASYNCHRONOUS NETWORK, NOTABLY AN ATM TYPE NETWORK, OF SIGNALLING DATA, CHANNEL BY CHANNEL, ASSEMBLED IN A MULTIFRAME TRANSMITTED SYNCHRONOUSLY IN OUT-OF-BAND MODE

[75] Inventors: Thierry Grenot, Clamart; Francois Tarbouriech, Les Ulis, both of France

[73] Assignee: Thomson-CSF, Puteaux, France

[21] Appl. No.: 811,077

[22] Filed: Dec. 20, 1991

[30] Foreign Application Priority Data

Dec. 20, 1990 [FR] France .................. 90 15997

[51] Int. Cl.$^5$ .................................. H04J 3/12
[52] U.S. Cl. .................. 370/94.1; 370/110.1
[58] Field of Search .......... 370/60.1, 91, 94.1, 370/94.3, 99, 110.1, 110.4, 111; 358/136

[56] References Cited

U.S. PATENT DOCUMENTS

| | | | |
|---|---|---|---|
| 4,731,785 | 3/1988 | Ferenc et al. | 370/60.1 |
| 5,020,058 | 5/1991 | Holden et al. | 370/94.1 |

FOREIGN PATENT DOCUMENTS 0355797 2/1990 European Pat. Off. .

OTHER PUBLICATIONS

ISS'90 Conference Record, vol. 2, May 28–Jun. 1, 1990, pp. 35–44, D. G. Fisher, et al., "A Flexible Network Architecture for the Introduction of ATM".

*Primary Examiner*—Benedict V. Safourek
*Attorney, Agent, or Firm*—Oblon, Spivak, McClelland, Maier & Neustadt

[57] ABSTRACT

In a device for the transmission, by an asynchronous network, notably a network of the ATM type, of signalling data elements, channel by channel, assembled in a multiframe transmitted synchronously in out-of-band mode, the information elements are conveyed, in the asynchronous network, in packets of data bits, each, packet being formed by an information cell including, firstly, a header carrying an address and, secondly, a useful field carrying the information to be transmitted. On a transmission side, the device includes an apparatus for acquiring signalling data elements of each channel of the multiframe; a device to detect changes in the state of these data elements; and a device for the generation, on the network, at each change thus detected, of an information cell containing the new signalling data element and the address associated with the corresponding channel. On a reception side, the device includes an apparatus for acquiring, from the network, the information cells containing signalling data elements; a device to memorize these signalling data elements between each corresponding change in state; and a device to insert the data elements thus memorized into a multiframe and to transmit this multiframe synchronously in an out-of-band mode.

3 Claims, 2 Drawing Sheets

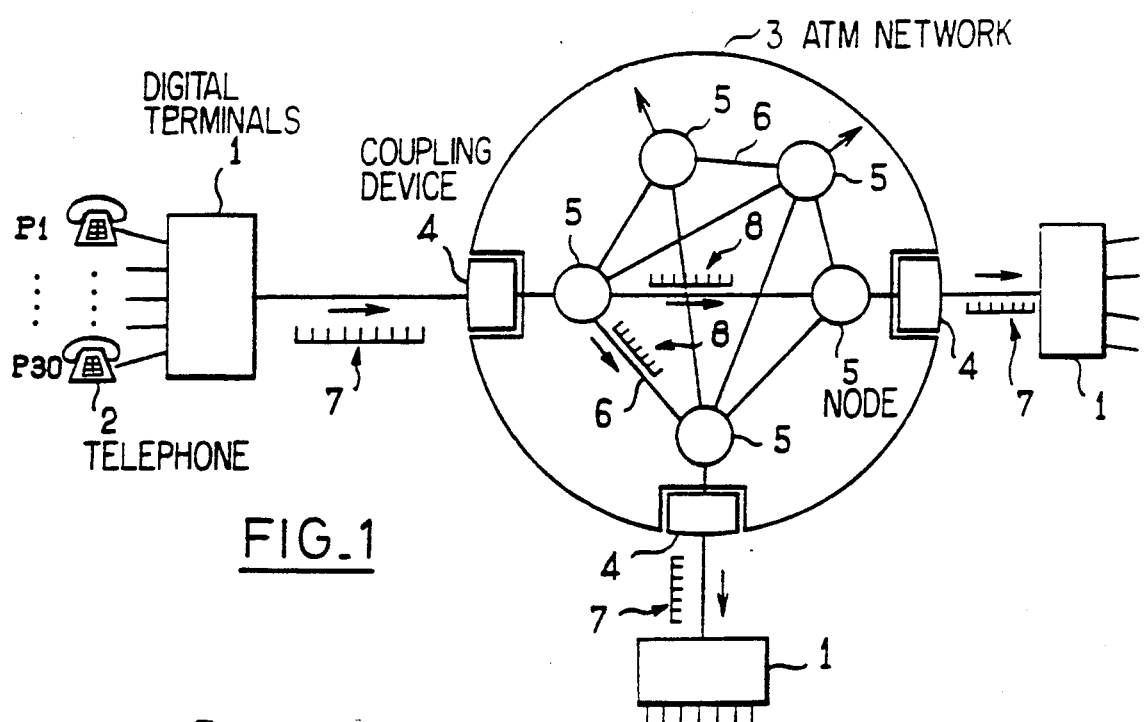
FIG_1
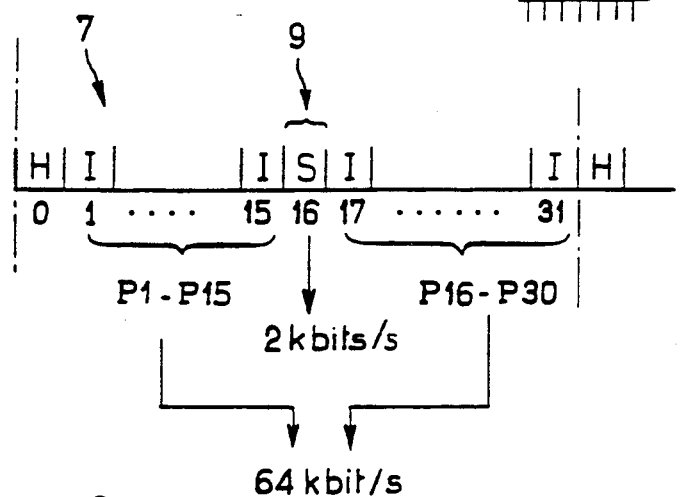
FIG_2
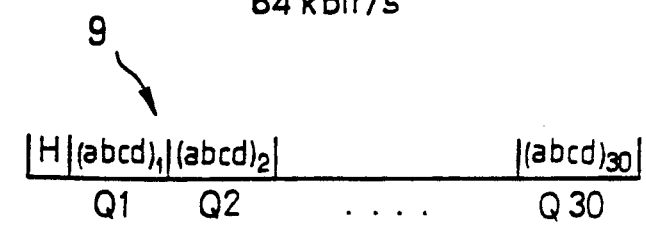
FIG_3
FIG_4

DEVICE FOR THE TRANSMISSION BY AN ASYNCHRONOUS NETWORK, NOTABLY AN ATM TYPE NETWORK, OF SIGNALLING DATA, CHANNEL BY CHANNEL, ASSEMBLED IN A MULTIFRAME TRANSMITTED SYNCHRONOUSLY IN OUT-OF-BAND MODE

BACKGROUND OF THE INVENTION

1. Field of the Invention

The invention relates to asynchronous transmission networks, notably networks of the so-called ATM (asynchronous transmission mode) type.

2. Description of the Prior Art

In these networks, digital information elements are transmitted discontinuously in the form of packets, also known as "information cells" in ATM terminology. This mode of transmission, instead of being a byte-by-byte transmission, consists in forming a packet of bits in the sender terminal equipment (the source of data) as and when the digital data elements are created, waiting for the number of information elements to be sufficient to fill up a complete information cell and sending this cell on the network.

The sending equipment thus produces information cells at a variable rate, depending on whether or not it uses the channel (for example, no cell is sent out during the instants of silence) or depending on the variable rate at which the digital information elements are produced (for example in the typical case of differential video signals, the data volume of which depends on the variable extent to which the image to be transmitted is a moving image).

The information cell that will go through the network includes, firstly, a header carrying an address or "virtual channel identifier" and, secondly, a useful field carrying the information to be transmitted.

The information cells coming from several transmitters are mingled in a continuous stream, possibly with interposed empty cells that travel along communications links with high bit-rates.

The different arteries of the network connect a plurality of nodes, each corresponding to a switching device that carries out the demultiplexing/multiplexing of the stream of cells as a function of the address contained in the header and of the resources available at the instant considered.

One of the specific features of an ATM type network relates to the fact that all that the switch does is to manage solely the header of each information cell, in determining the destination address from the header of the incoming cell and in computing a new header from this parameter, said new header corresponding to the (virtual) channel which will have been assigned to the link that is switched over downline from this node.

In particular, no check (intrinsic error check, acknowledgment protocol, etc.) is made on the transmitted data elements, the checks if any being transferred to the ends of the line, i.e. to the two installations exchanging the information elements which should therefore check the integrity and conformity of the information elements exchanged.

Most usually, however, the ATM network is connected to a device transmitting in a mode other than the ATM mode, either because the asynchronous network is connected to a terminal installation of another type or because it is in fact only a sub-unit of a bigger network including, for example, a standard type of synchronous switch to which the asynchronous network is connected.

One of the aims of the present invention, particularly in a case such as this where the ATM network has to be coupled to a pre-existing device or switch of another type, is to enable the transmission of signalling data that is sent out synchronously.

Indeed, until now, the signalling data generated and received by the digital terminals of installations in synchronous mode called "out-of-band channel-by-channel" mode are assembled, in accordance with the CCITT G704 recommendation, in a "multiframe" circulating on one of the time intervals transmitted in synchronous mode.

More precisely, again in accordance with the above-mentioned recommendation, each frame is divided into 31 temporal units, namely 30 temporal units assigned to the transmission of the data elements proper (associated with 30 different channels) and one temporal unit that has been arbitrarily assigned the 16th position in the frame, containing the signalling data associated with these 30 channels.

More precisely, the temporal unit assembling these signalling data elements, also called a "multiframe", contains a sequence of 30 quadruplets, each one of which corresponds to the signalling data element (16 possible values) associated with each of the 30 channels.

In this standard mode of transmission, the synchronous frames therefore convey simultaneously the information elements proper (at a typical rate of 64 kbits/s) and the signalling data (at 2 kbits/s). Since the passbands that correspond to these two series of respective information elements are distinct, the term "out-of-band signalling" is used.

The ATM transmission mode is entirely different since, as indicated further above, the ATM network does not analyze the content of the information elements and therefore makes no distinction between information elements proper and signalling data elements.

A possible and immediate approach would consist in generating an ATM cell at each quadruplet received and in conveying this cell in the desired direction.

However, this approach would be very cumbersome to implement since a complete cell would have to be generated and conveyed at each instant of recurrence of the information element, i.e. every 2 ms (the ATM cells have a fixed length: it is therefore necessary to generate a complete cell to transmit a single quadruplet).

Apart from the cumbersome nature of its implementation, an approach such as this would lead to the creation of a large stream of cells, creating a non-negligible degree of congestion in the various communications links of the ATM network.

SUMMARY OF THE INVENTION

To overcome this drawback, the present invention essentially proposes analyzing the different successive quadruplets of each channel, detecting the changes in the states of these quadruplets and sending a cell only if the corresponding quadruplet considered differs from the preceding quadruplet relative to the same channel, i.e. in other words, operating in "transitional mode".

In this case, the principle of ATM transmission proves to be especially advantageous since it enables the sending of the signalling data only when this is necessary (i.e. in fact with a relative degree of infrequency since the signalling data generally assume only a small number of values during one and the same communication).

By contrast, in a standard type of synchronous transmission, the signalling data element is transmitted systematically, permanently occupying a complete channel (the signalling channel at 2 kbit/s) for 30 information channels.

To this effect, the device of the invention, which is of the above-mentioned type, namely a device for the transmission, by an asynchronous network, notably an ATM type network, of signalling data elements, channel by channel, assembled in a multiframe transmitted synchronously in out-of-band mode, the information elements being conveyed, in the asynchronous network, in packets of data bits, each packet being formed by an information cell comprising, firstly, a header carrying an address and, secondly, a useful field carrying the information to be transmitted, wherein said device comprises:

at transmission:
means to acquire the signalling data elements of each channel of the multiframe;
means to detect changes in the state of these data elements; and
means for the generation, on the network, at each change thus detected, of an information cell containing the new signalling data element and the address associated with the corresponding channel;

at reception:
means for acquiring, from the network, the information cells containing signalling data elements;
means to memorize these signalling data elements between each corresponding change in state; and
means to insert the data elements thus memorized into a multiframe and to transmit this multiframe synchronously in out-of-band mode.

Preferably, said means to generate information cells generate, in addition, repetitively and independently of the changes in state, an information cell containing the current signalling data element and the address relating to the corresponding channel Preferably again, the information cell generated at transmission contains a redundant form of the new signalling data element in its useful field carrying the information to be transmitted, means being provided at reception to check the conformity of this new data element as received and to carry out a correction if necessary.

BRIEF DESCRIPTION OF THE DRAWINGS

Other features and advantages of the invention shall appear from the following detailed description, made with reference to the appended figures.

FIG. 1 gives a schematic view of an asynchronous transmission network connecting a plurality of terminal installations working in synchronous mode, notably in relation to the transmission of signalling information;

FIG. 2 shows the general structure of the frame transmitted in the synchronous network for each corresponding time interval;

FIG. 3 shows the general structure of the multiframe used, within this frame, for the transmission of the signalling data elements by this same synchronous frame;

FIG. 4 shows the general structure of an information cell transmitted by the ATM network;

DESCRIPTION OF THE PREFERRED EMBODIMENTS

Figure 5:
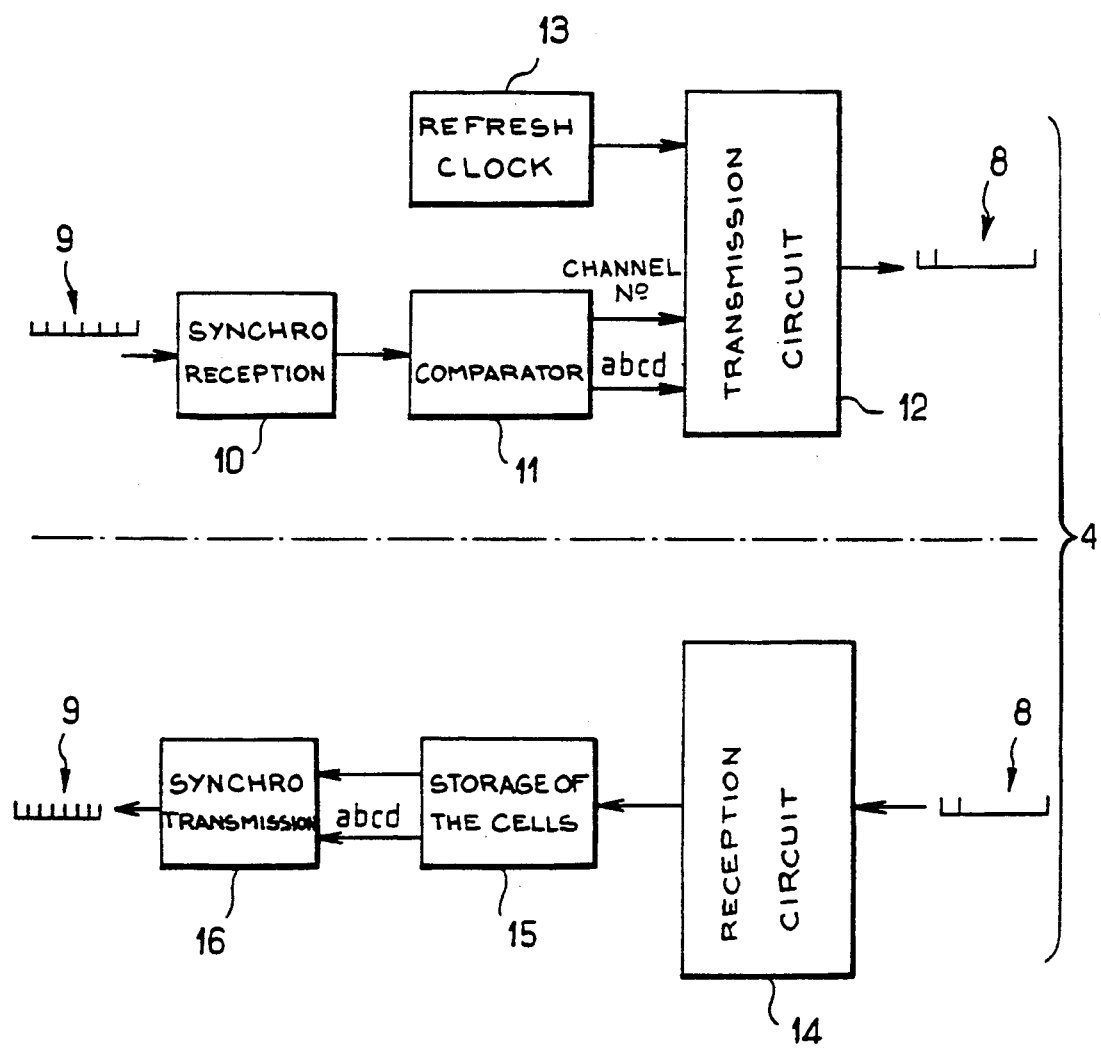
FIG. 5 shows the structure of the main elements of the interfacing coupling device according to the invention, placed between the synchronous network and the asynchronous network.

In FIG. 1, the references 1 designate the terminal digital installations, each one of which manages a plurality of telephone sets 2 (or other devices for the transmission of data by the switched network) referenced $P_1$ to $P_{30}$.

These terminals 1, in a manner known per se, send out multiplexed synchronous frames at a typical rate of 1 Mbit/s.

The object of the invention is to enable the interfacing of these synchronous links with an ATM transmission network symbolized at 3, by means of coupling devices 4, providing for the appropriate conversion of the signals and the conversion of the transmission modes.

This ATM network 3 has a plurality of network nodes 5 connected to one another by links 6 working at a high bit-rate.

In the synchronous network, the information elements travel in the form of multiplexed frames 7, one of which is shown in greater detail in FIG. 2 while, in the asynchronous network, the information elements travel in the form of undifferentiated individual cells, referenced 8, one of which is shown in greater detail in FIG. 4.

The information can be notably applied to the processing of a continuous transfer of information elements by digital train at 2,048 Mbits/s in an ATM network using high-speed (34,368 Mbits/s) arteries conveying cells with a useful load of 32 octets, corresponding to the generation of the source node of a cell every 125 $\mu$s.

However, the method is naturally not restricted to these numerical values and may be applied to other link and service values.

As for the synchronous frame 7, as illustrated in FIG. 2, for each temporal interval (i.e. for each interval between the dot-and-dash lines) it has a division of the time into 32 temporal units comprising:

a header H enabling the identification of the start of the frame (channel 0), 30 information blocks, corresponding to the data elements proper transmitted by each of the sets $P_1$ to $P_{30}$ (channels 1 to 15 and 17 to 31), and a temporal unit grouping together all the signalling data elements associated with the sets $P_1$ to $P_{30}$ (multiframe on channel 16).

The last-mentioned temporal unit (referenced 9) is illustrated in greater detail in FIG. 3 where it can be seen that it has, in addition to a header H, a series of 30 quadruplets $Q_1$ to $Q_{30}$, each formed by four bits abcd giving the signalling associated with the corresponding channel.

FIG. 4 shows the structure of the cells 8 transmitted by the asynchronous network, each cell comprising a header 8a, containing an address used for the routing of the cell, and a useful field 8b that is a carrier of the information to be transmitted itself. The dimensions of the fields 8a and 8b are, typically, 32 bits and 256 bits respectively but other dimensions may equally well be considered.

A description shall now be given, with reference to FIG. 5, of the structure and working of the coupling device that provides for the interfacing between the synchronous network and the asynchronous network, i.e. in other words enabling the conversion of the multiframes 9 into individual ATM cells 8 and vice versa (the standard mechanism enabling the extraction of the multiframe 9 from the frame 7 and its insertion therein shall not be described).

Essentially, this coupling device comprises:

on the transmission side (i.e. in the "synchronous-to-asynchronous" direction):

a synchronous reception circuit 10 enabling the acquisition of the binary elements of the multiframe 9;

a compartor 11, designed to reveal the changes in state, between two successive multiframes, of the quadruplets associated with each channel;

a refresh cyclical clock 13, and a transmission circuit 12 associating, with each of the channels, the elements necessary for the generation of an ATM cell 8 containing the useful information elements to be transmitted and the destination of this information;

on the reception side (namely in the "asynchronous-to-synchronous" direction):

a reception circuit 14 enabling the acquisition, from the ATM network, of the individual cells 8 associated with each channel;

a circuit 15 enabling the storage of the corresponding information elements and, hence, making it possible to have permanent knowledge, between two changes in state, of the value of the signalling data element associated with each of the channels, and a circuit 16 enabling the insertion, in the outgoing multiframe 9, of the values of the signalling data elements of all the channels.

As indicated further above, the principle of the invention consists in making no transmission in the ATM network except when there is a change in value of the gradruplet associated with a channel. In this case, a cell 8 is sent to the homologous distant system. This cell 8 includes, as shown in FIG. 4, the number of the channel (in the address field 8a) and the new value of the gradruplet abcd (in the information field 8b).

This enables a very substantial saving of resources within the ATM network, owing to the fact that the changes in state are (most usually) far less frequent than the recurrence period of one multiframe.

In order to enable the initialization of the system and to cope with possible losses of information in the ATM network, the above information elements are also transmitted (or retransmitted) at each period of the refresh clock 13, hence independently of whether or not there has been a change in the value of the quadruplet.

Furthermore, in order to get rid of most of the errors that may occur during the transfer of the information elements, and given the fact that the information elements conveyed (4 bits) occupy only a small part of the available field (256 bits) in the ATM cell, it is easy to introduce high redundancy in the body of the cell: a detection of possible errors and their correction, if necessary, is then done in the reception circuit 14 during the acquisition of the corresponding cell. This has been shown in FIG. 4 by the repetition of the pattern abcd.

The system whose structure has just been explained works as follows.

First of all, the circuit 10 for the synchronization of the reception acquires the incoming multiframe and maintains the synchronism of the device on this multiframe.

the comparator 11 makes a channel-by-channel examination of the content of the current multiframe (the nth one) and compares this content with that of the preceding (the n−1th) one. If it determines a quadruplet (abcd)$_{i,n}$ different from the quadruplet (abcd)$_{i,n-1}$ relating to the same channel (the ith one), it informs the transmission circuit 12 which will then form an ATM cell, the header of which is assigned to the channel number concerned (i), this ATM cell containing the value of the new quadruplet (abcd)$_n$ in its field of useful information elements. This cell is then sent out in the ATM network.

When the cell reaches the reception circuit 14 of the distant coupling device the junctor connecting the ATM network to the terminal installation to which the information is sent), this reception circuit determines the channel concerned (from the header of the cell) and the new quadruplet (from the information field of the cell). This quadruplet is then memorized in the storage circuit 15, then inserted by the circuit 16, at the appropriate instant, into the outgoing multiframe, and in all the following multiframes until the detection of a new multiplet value on this channel. In this respect, it will be noted that, unlike that synchronous transmission circuit 12, the synchronous transmission circuit 16 systematically generates a multiframe at each period of recurrence of the synchronous network.

What is claimed is:

1. A device for the transmission, by an asynchronous network, of signalling data elements corresponding to a plurality of channels of the asynchronous network, said signalling data elements being arranged in a multiframe so as to form a frame of information with the channels, said multiframe being transmitted synchronously in an out-of-band mode from the synchronous network to the asynchronous network, and wherein a plurality of information elements are conveyed along the asynchronous network in packets of data bits, each packet being formed by an information cell comprising a header for carrying an address, and a useful field for carrying information to be transmitted along the asynchronous network, the device comprising, at transmission, means for extracting the signalling data elements from a first multiframe of a selected frame, said first multiframe including a first signalling data element;

means for detecting a change in a state of the extracted signalling data elements of the first multiframe, said change resulting from the occurrence, in a second multiframe of a frame succeeding said selected frame, of a second signalling data element which is different from the first signalling data element in said first multiframe, wherein said first and second signalling data elements correspond to the same channel of the first and second multiframes;

means for generating on the asynchronous network, on the basis of said detected change, an information cell including said second signalling data element and n address corresponding to said same channel; and further comprising, at reception, means for receiving, from the asynchronous network, said information cell which includes said second signalling data element;

means for storing said signalling data elements corresponding to said plurality of channels before said change in the state of the extracted signalling data elements and after said change in the state; and means for inserting the stored data elements into an outgoing multiframe which is transmitted synchronously in said out-of-band mode from the asynchronous network to the synchronous network.

2. The device of claim 1, wherein said means for generating said information cell generates, in addition, repetitively and independently of the change in state, an information cell containing a current signalling data element and the address corresponding to said same channel.

3. The device of claim 1, wherein said means for generating said information cell generates an information cell containing a redundant form of the second signalling data element in its useful field carrying the information to be transmitted.

* * * * *